United States Patent
Bramley

[11] Patent Number: 5,788,918
[45] Date of Patent: Aug. 4, 1998

[54] DROSS PRESS FUME EXTRACTION SYSTEM

[76] Inventor: Alan Bramley, Harrimans Lane, Dunkirk, Nottingham, NG7 2SD, Great Britain

[21] Appl. No.: 860,551
[22] PCT Filed: Apr. 12, 1996
[86] PCT No.: PCT/GB96/00888
§ 371 Date: Jun. 27, 1997
§ 102(e) Date: Jun. 27, 1997
[87] PCT Pub. No.: WO96/32514
PCT Pub. Date: Oct. 17, 1996

[30] Foreign Application Priority Data

Apr. 12, 1995 [GB] United Kingdom ............ 9507605
Sep. 14, 1995 [GB] United Kingdom ............ 9518794

[51] Int. Cl.⁶ .................................................. C21B 3/04
[52] U.S. Cl. ............................ 266/158; 266/227; 75/672
[58] Field of Search ........................ 266/158, 159, 266/205, 227, 144; 75/640, 655, 672

[56] References Cited

U.S. PATENT DOCUMENTS

| | | | |
|---|---|---|---|
| 4,003,559 | 1/1977 | Kuwano et al. | 266/227 |
| 4,057,232 | 11/1977 | Ross et al. | 266/227 |
| 4,527,779 | 7/1985 | Roth et al. | 266/227 |
| 4,575,056 | 3/1986 | Julliard et al. | 266/227 |
| 4,842,255 | 6/1989 | Innus et al. | 266/158 |
| 5,397,104 | 3/1995 | Roth | 75/672 |
| 5,439,501 | 8/1995 | Watanabe et al. | 75/672 |
| 5,599,379 | 2/1997 | Spoel et al. | 266/227 |
| 5,669,957 | 9/1997 | Roth | 266/227 |

FOREIGN PATENT DOCUMENTS 406049550  2/1994  Japan ........................ 75/672

*Primary Examiner*—Scott Kastler
*Attorney, Agent, or Firm*—Reese Taylor

[57] ABSTRACT

A dross press is enclosed within a cabinet which is normally maintained at a negative pressure relative to ambient air pressure. The cabinet is provided with locked doors to prevent egress of explosive gases or pieces of metal. The cabinet is also equipped with safety vents at a high level to prevent destruction of the cabinet by internal explosions. The cabinet also is provided with a fan for extracting fumes therefrom. The fan is connected to a purifier to treat the extracted fumes and air inlet holes in the press head so that the fan may draw air through the head for cooling.

12 Claims, 2 Drawing Sheets

DROSS PRESS FUME EXTRACTION SYSTEM

The present invention relates to fume extraction systems for dross presses and more particularly for aluminium dross presses.

In known dross presses such as described in U.S. Pat. Nos. 4,057,232, 4,386,956, and 5,397,104 the dross is pressed by being firstly tipped into a skim box and then pressed with a press head.

The inventors have discovered that when dross is pressed there can be very substantial fumes developed. In certain circumstances explosions can occur during pressing operations and these can result in hot gasses being emitted which may result in possible damage to adjacent machinery or even operators. In unusual circumstances, pieces of dross may be projected from the skim box which may be projected over substantial distances.

The known dross presses rely on the close fitting of the dross press head and the skim box to contain such explosions but these have been found to be only partially successful. Even if totally successful in preventing projection of particles, the fumes emitted can be very substantial.

The present invention has for a first object to provide a dross press fume extraction system to reduce the fumes emitted from the dross press when pressing dross.

The present invention also has for a second object to provide a protection system for a dross press to contain explosions within the press.

The present invention provides a dross press fume extraction system comprising a cabinet enclosing the dross press, fume extraction means connected to the cabinet, the fume extraction means including fan means, said fan means developing a negative air pressure within the cabinet to extract fumes from within the cabinet, said fan means being connected to a fume purification apparatus to purify the extracted fumes.

Preferably the cabinet is provided with front doors with interlocking engagement means preventing opening of the doors in the event of an explosion within the cabinet.

Preferably the interlocking engagement means is hydraulically controlled and comprises means for preventing operation of the dross press until the engagement means is locked.

Preferably the cabinet comprises air outlet means situated at the top of the cabinet to allow expulsion of explosive gases at an upper level.

In a preferred embodiment the fume extraction fan means comprises means for cooling the dross press head, the fumes being drawn through the press head to cool the head.

Embodiments of the present invention will now be described by way of example with reference to the accompanying drawings in which:

Figure 1:
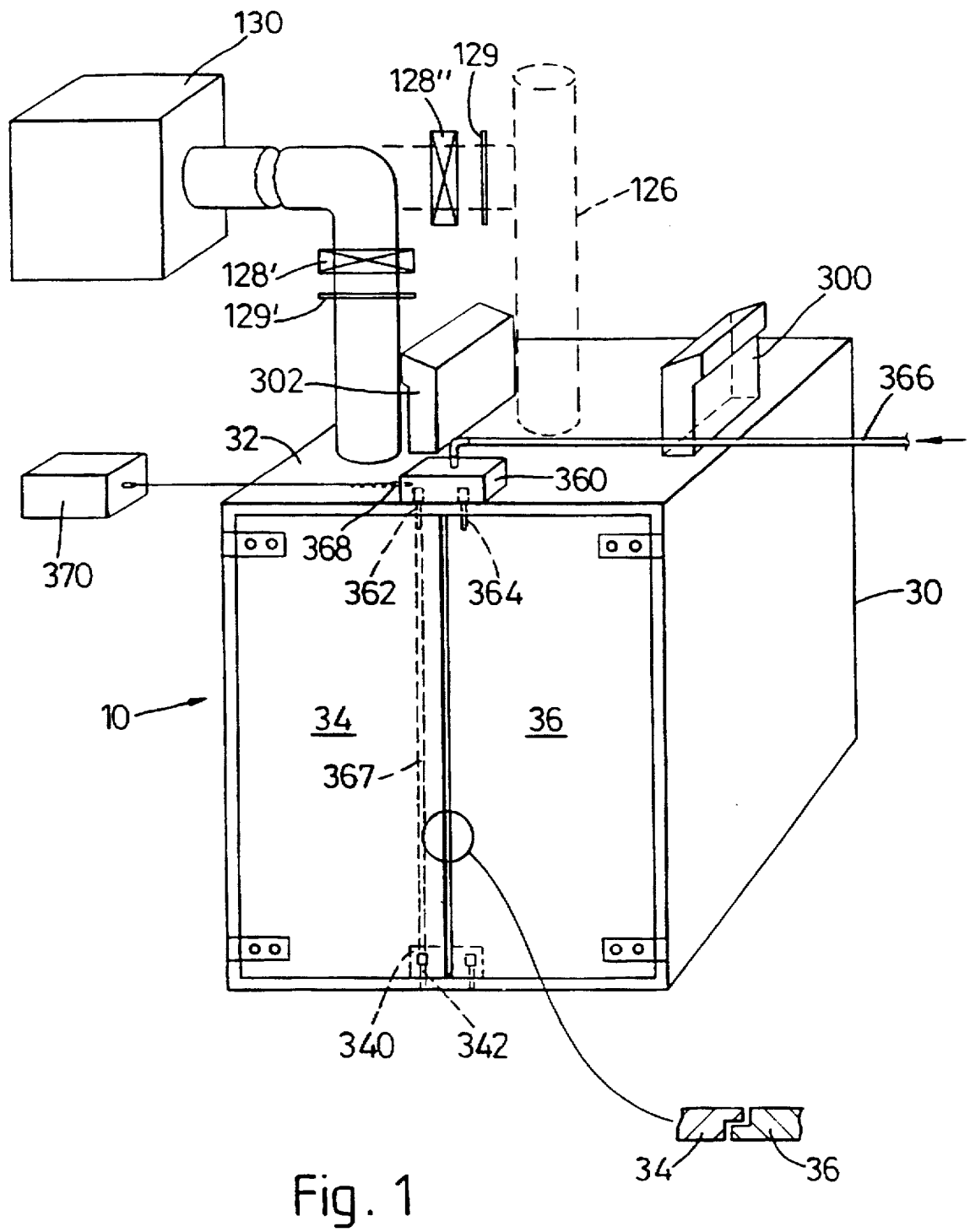
FIG. 1 shows diagrammatically a dross press incorporating a fume extraction system in accordance with the present invention.

With reference now to the drawings, the dross press 10 comprises a press head 12 and a skim box 14 and sow mould 16 to catch the molten liquid. The press is normally used for aluminium and this will be referred to hereafter.

In known manner hot dross 18 is placed into the skim box 14 and the press head 12 is hydraulically operated in the direction indicated by arrows 20 to press molten liquid from the dross.

In co-pending British Patent Applications Nos. 9507605.5 and 9518794.4 the contents of which are incorporated herein by way of explanation, the head 12 is cooled by passage of cooling air or fumes through inlet holes 120, 122 etc in the upper surface of head 12. The cooling air/fumes are extracted as described via a hollow ram 124 via an intermediate chamber 126 and a fan 128 to purification apparatus 130 (FIG. 1). The purification apparatus can be of a known type separate to or included in the purification apparatus associated with the furnace from which the hot dross is obtained.

In the present invention the head 12, skim box 14 and sow mould 16 are contained within a cabinet 30 which completely encloses the press, the cabinet having a top surface 32 through which hydraulic ram structure 124, 126 passes.

Figure 2:
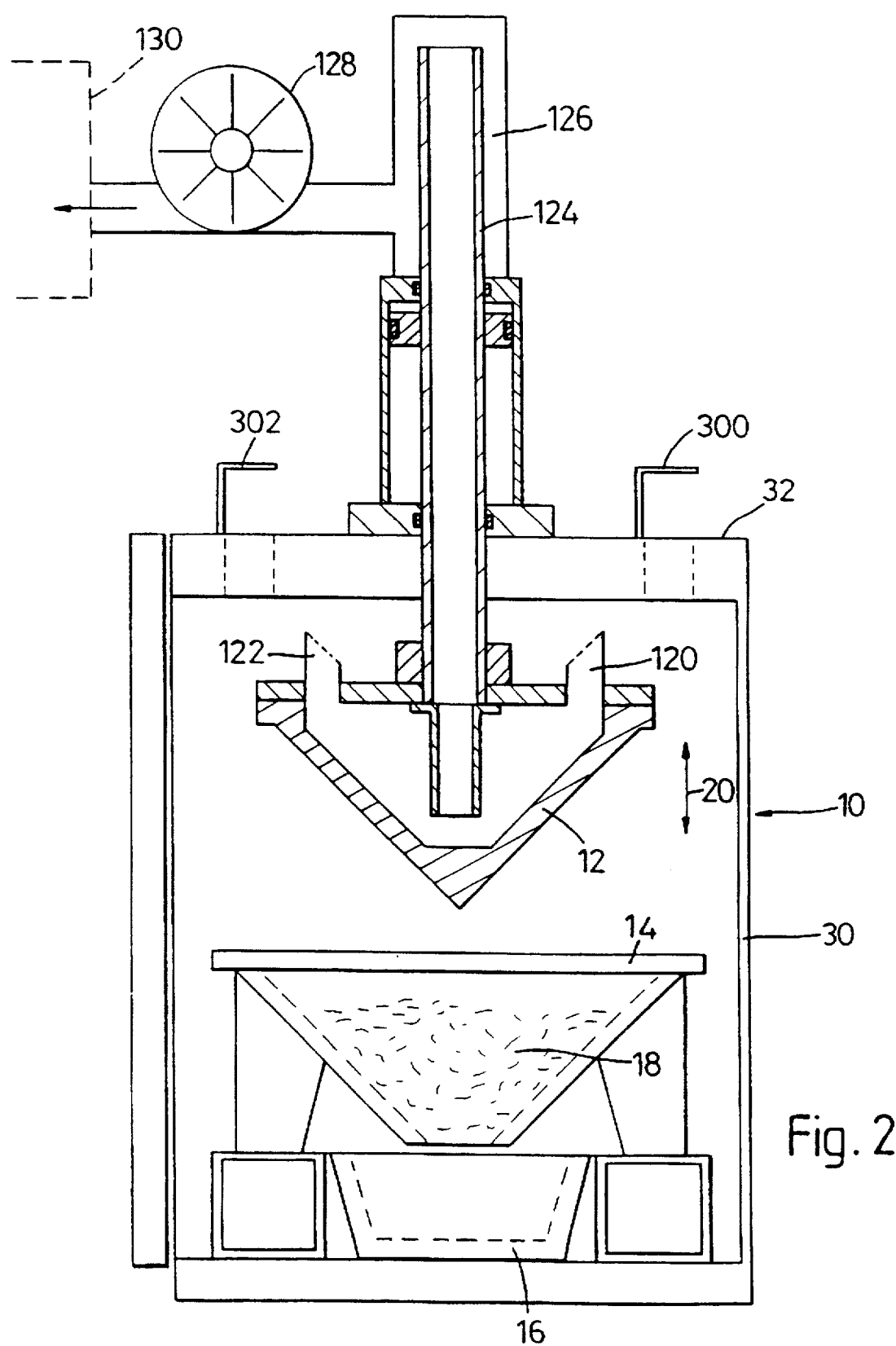
FIG. 2 shows a cross-sectional front elevation of the fume extraction cabinet of FIG. 1.

In a first embodiment illustrated in FIG. 2 air and fumes from within cabinet 30 are drawn via inlets 120, 122 etc and evacuated via fan 128 to fume purification apparatus 130.

Fan 128 is dimensioned to produce a negative air pressure within cabinet 30 such that all fumes are extracted from within the cabinet and one, in normal circumstances, escape directly into the atmosphere. The an 128 is therefore designed in accordance with the size of the cabinet 30 and also in relation to the size of the press head 12 and slim box 14.

In an alternative embodiment shown in FIG. 1 the extraction system of FIG. 2 is shown in dotted outline.

In FIG. 1 the fumes are extracted from a different position on the top surface 32. The fumes are therefore not used to cool the head prior to being extracted. The head can be cooled as in FIG. 2 or can be cooled by other means or not cooled at all.

In the system of FIG. 1 the fumes are directly extracted from the cabinet 30 and therefore the extraction system will not be dependent on the size of the head and the cooling system for the head. When used in combination with the extraction system shown in FIG. 2 the air/fume flow can be balanced to provided an adequate flow of air through the head 12. This can be done via separate fans 128', 128" or by suitable damping using dampers 129, 129'. In each case it is necessary if head cooling is required to ensure adequate flow of air through the head.

In fully enclosing the press 12, 14, the inventors realise that a problem is created since if an explosion occurs within cabinet 30 the cabinet could be destroyed and may itself explode. In the present invention two measures are taken to cope with this emergency.

First the cabinet 30 is equipped with front doors 34,36 which are provided with locking means 340, 360 which when engaged ensure that the doors 34, 36 are locked at the top and bottom by interlocking systems. In known manner door 34 can be arranged to close first and to be recessed so that door 36 engages with it as shown in the inset. Hydraulically operated bolts 342, 362, 364 operated via a hydraulic line 366 are then preferably operated to lock the doors top and bottom. Alternatively, bolts 342, 362, 364 may be mechanically linked by rod 366 (shown dotted) to ensure interlocking engagement.

These bolts 342, 362, 364 may be provided with sensors 368 to detect full operation of the bolts. In the event that incorrect operation of the bolts is detected, the press head movement may be inhibited via control 370. Such detection systems are known and thus these will not be described in greater detail.

Once the cabinet doors are interlocked in a secure manner, the operation of the press is allowed. When the press head 12 descends it is possible that compression of the dross will create an explosion within the cabinet. Due to the strength of the cabinet, which is preferably made from steel plate, any particles will be contained but a large increase in pressure will occur which may result in damage to the cabinet or in the event of a large explosion actual destruction of the cabinet.

To avoid this damage one or more vents 300, 302 are provided in the upper surface 32 of the cabinet. These vents allow gases to exhaust from the cabinet in the event of an explosion within the cabinet but are not of sufficient size to affect the normal operation of fan 128 in maintaining a negative air pressure within the cabinet. Thus in normal operation air will be drawn into the cabinet 30 via vents 300, 302 and only during explosions within cabinet 30 will fumes be emitted via vents 300, 302.

The vents 300, 302 are situated on top of the cabinet which will in most designs be at a height of 10 feet (3 metres) or more from the floor level. The vents are shaped to direct explosive gases in a predetermined direction or directions which can be arranged to be away from an operator. Thus the explosive gases will be most unlikely to cause any injury and any flying pieces of metal will be contained within container 30.

Under most circumstances therefore the press will not emit any fumes and will therefore pass environmental standards. Only in the event of an explosion will fumes be emitted for a short period.

I claim:

1. A dross press fume extraction system comprising a cabinet enclosing the dross press, fume extraction means connected to the cabinet, the fume extraction means including fan means, said fan means developing a negative air pressure within the cabinet to extract fumes from within the cabinet, said fan means being connected to a fume purification apparatus to purify the extracted fumes, wherein the cabinet is provided with front doors with interlocking engagement means preventing opening of the doors in the event of an explosion within the cabinet.

2. A dross press fume extraction system as claimed in claim 1 in which the interlocking engagement means is hydraulically controlled and comprises means for preventing operation of the dross press until the engagement means is locked.

3. A dross press fume extraction system as claimed in claim 1 in which the cabinet comprises air outlet means situated at the top of the cabinet to allow expulsion of explosive gases at an upper level.

4. A dross press fume extraction system as claimed in claim 1 in which the fume extraction fan means comprises means for cooling a dross press head, the fumes being drawn through the dross press head to cool the dross press head.

5. A dross press fume extraction system comprising a cabinet having front doors enclosing the dross press, fume extraction means connected to the cabinet, the fume extraction means including fan means, said fan means developing a negative air pressure within the cabinet to extract fumes from within the cabinet, said fan means being connected to a fume purification apparatus to purify the extracted fumes, means for locking the front doors, and means for preventing operation of the dross press until the locking means is engaged.

6. A dross press fume extraction system as claimed in claim 5 in which the cabinet comprises air outlet means situated at the top of the cabinet to allow expulsion of explosive gases at an upper level.

7. A dross press fume extraction system as claimed in claim 5 in which the fume extraction fan means comprises means for cooling a dross press head, the fumes being drawn through the dross press head to cool the dross press head.

8. A dross press fume extraction system comprising a cabinet enclosing the dross press, fume extraction means connected to the cabinet, the fume extraction means including fan means, said fan means developing a negative air pressure within the cabinet to extract fumes from within the cabinet, said fan means being connected to a fume purification apparatus to purify the extracted fumes, wherein the fume extraction fan means further comprises means for cooling a dross press head, the dross press head having air inlet holes, the fumes being drawn through the air inlet holes via the fan means to cool the head.

9. A dross press fume extraction system as claimed in claim 8 in which the cabinet is provided with front doors with interlocking engagement means preventing opening of the doors in the event of an explosion within the cabinet.

10. A dross press fume extraction system as claimed in claim 9 in which the interlocking engagement means is hydraulically controlled and comprises means for preventing operation of the dross press until the engagement means is locked.

11. A dross press fume extraction system as claimed in claim 8 in which the cabinet comprises air outlet means situated at the top of the cabinet to allow expulsion of explosive gases at an upper level.

12. A dross press fume extraction system as claimed in claim 8 further comprising a hollow ram for driving the dross press head, wherein the hollow ram evacuates fumes from the air inlets to the fan means.

* * * * *